United States Patent
Abdolkhani et al.

(10) Patent No.: US 10,325,719 B2
(45) Date of Patent: Jun. 18, 2019

(54) MAGNETICALLY PERMEABLE CORE AND AN INDUCTIVE POWER TRANSFER COIL ARRANGEMENT

(71) Applicant: Apple Inc., Cupertino, CA (US)

(72) Inventors: Ali Abdolkhani, Auckland (NZ); Aiguo Hu, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/312,398

(22) PCT Filed: May 14, 2015

(86) PCT No.: PCT/NZ2015/050056
§ 371 (c)(1),
(2) Date: Nov. 18, 2016

(87) PCT Pub. No.: WO2015/178781
PCT Pub. Date: Nov. 26, 2015

(65) Prior Publication Data
US 2017/0092419 A1    Mar. 30, 2017

Related U.S. Application Data

(60) Provisional application No. 62/000,237, filed on May 19, 2014.

(51) Int. Cl.
| | | |
|---|---|---|
| H01F 21/04 | (2006.01) | |
| H01F 38/14 | (2006.01) | |
| H01F 3/10 | (2006.01) | |
| H01F 38/18 | (2006.01) | |
| H02J 5/00 | (2016.01) | |
| H02J 7/02 | (2016.01) | |

(52) U.S. Cl.
CPC ............. *H01F 38/14* (2013.01); *H01F 3/10* (2013.01); *H01F 21/04* (2013.01); *H01F 38/18* (2013.01); *H02J 5/005* (2013.01); *H02J 7/025* (2013.01)

(58) Field of Classification Search
CPC ................................................ H01F 21/00–06
See application file for complete search history.

(56) References Cited

U.S. PATENT DOCUMENTS

| | | |
|---|---|---|
| 5,000,178 A | 3/1991 | Griffith |
| 5,469,036 A | 11/1995 | Eto |
| 6,151,231 A | 11/2000 | Saint-Pierre et al. |
| 6,320,772 B1 | 11/2001 | Doyama et al. |
| 7,197,113 B1 | 3/2007 | Katcha et al. |

(Continued)

FOREIGN PATENT DOCUMENTS

| | | |
|---|---|---|
| CN | 101461114 | 6/2009 |
| JP | 3-133110 | 6/1991 |

(Continued)

OTHER PUBLICATIONS

Abdolkhani A. et al., "A Novel Detached Magnetic Coupling Structure for Contactless Power Transfer", IECON/ICELIE, 1103-1108 (2011).

(Continued)

*Primary Examiner* — Tuyen T Nguyen
(74) *Attorney, Agent, or Firm* — Joseph F. Guihan (57) ABSTRACT

An inductive power transfer coil assembly including: a magnetically permeable core including a base having a pair of spaced apart limbs extending therefrom; and a winding located between and above the pair of spaced apart limbs.

19 Claims, 5 Drawing Sheets

(56) References Cited

U.S. PATENT DOCUMENTS

| | | | |
|---|---|---|---|
| 2005/0068019 | A1 | 3/2005 | Nakamura et al. |
| 2005/0133497 | A1 | 6/2005 | Makoto |
| 2007/0064406 | A1 | 3/2007 | Beart |
| 2008/0303351 | A1 | 12/2008 | Jansen et al. |
| 2010/0259217 | A1 | 10/2010 | Baarman et al. |
| 2010/0289340 | A1 | 11/2010 | Boys et al. |
| 2012/0188041 | A1 | 7/2012 | Kook |
| 2013/0026850 | A1 | 1/2013 | Throngnumchai et al. |
| 2013/0030892 | A1 | 1/2013 | Liu et al. |
| 2013/0119773 | A1 | 5/2013 | Davis |
| 2014/0091755 | A1 | 4/2014 | Walley |
| 2014/0197687 | A1 | 7/2014 | Lin |

FOREIGN PATENT DOCUMENTS

| | | |
|---|---|---|
| JP | H06277358 | 10/1994 |
| JP | 2001044054 | 2/2001 |
| JP | 2002246248 | 8/2002 |
| JP | 2006042519 | 2/2006 |
| JP | 2006128381 | 5/2006 |
| JP | 2007505480 | 3/2007 |
| JP | 2011229360 | 11/2011 |
| JP | 2011229360 A | 11/2011 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 2008137996 A1 | 11/2008 |
| WO | 2008140333 | 11/2008 |
| WO | 2009004587 A2 | 4/2009 |
| WO | 2010090539 | 8/2010 |
| WO | 2011016737 | 2/2011 |
| WO | 2013036146 A1 | 3/2013 |
| WO | 2013122483 A1 | 8/2013 |
| WO | 2014083015 A1 | 6/2014 |

OTHER PUBLICATIONS

Abdolkhani, A. et al., "Face to Face Through-hole Contactless Slipring System for Rotary Applications", IJAREEIE, 2(9): 4277-4286 (2013).

Abdolkhani, A. et al., "Modelling and Parameters Identification of Through-Hole Type Wind Turbine Contactless Sliprings", SCIRP/ Engineering, 4: 272-283 (2012).

Kacprzak, D. "A Novel S-Pickup for High Power Inductive Power Transfer Systems", Magnetics Conference, INTERMAG, 1 pg. (2006).

Legranger, J. et al., "Comparison of Two Optimal Rotary Transformer Designs for Highly Constrained Applications", Electric Machines & Drives Conference, IEMDC, 1546-1551 (2007).

Papastergiou, K. et al., "An Airborne Radar Power Supply With Contactless Transfer of Energy—Part I: Rotating Transformer", IEEE Transactions on Industrial Electronics, 54(5): 2874-2884 (2007).

Papastergiou, K. et al., "Contact-less Transfer of Energy by means of a Rotating Transformer", IEEE ISIE, 1735-1740 (2005).

Potter, B.A. et al., "Design, Implementation and Characterisation of a Contactless Power Transfer System for Rotating Applications", IEEE, 2168-2173 (2006).

Spackman, D. et al., "Magnetic Interference in Multi-Pickup Monorail Inductively Coupled Power Transfer Systems, Journal of the Japan Society of Applied Electromagnetics and Mechanics", 15(3): 238-241 (2007).

International Search Report for International Patent Application No. PCT/NZ2015/050056 dated Jul. 14, 2015, 4 pgs.

Abdolkhani, A. et al., "A Sandwiched Magnetic Coupling Structure for Contactless Slipring Applications", International Geoinformatics Research and Development, 2(3): 1-9 (2011).

Esser, A. et al., "A New Approach to Power Supplies for Robots", IEEE Transactions on Industry Applications, 27(5): 872-875 (1991).

Kacprzak, D. et al., "An Improved Magnetic Design for Inductively Coupled Power Transfer System Pickups", Power Engineering Conference, IPEC, 1133-1136 (2005).

Moradewicz, A.J. et al., "High efficiency contactless energy transfer system with power electronic resonant converter", Technical Sciences, 57(4): 375-381 (2009).

Muljadi, E. et al., "Pitch-Controlled Variable-Speed Wind Turbine Generation", Industry Applications Conference, 34th IAS Annual Meeting, Conference Record of the 1999 IEEE, 1: 323-330 (1999).

Zaheer, A. et al., "A Bipolar Pad in a 10 kHz, 300W Distributed IPT System for AGV applications", IEEE Transactions on Industrial Electronics, pp. 1-14 (2013).

European Search Report for EP Application No. 15796688.8 dated Nov. 5, 2017 (8 pages).

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

Bosshard et al., "Comprehensive Evaluation of Rectangular and Double-D Coil Geometry for 50 kw/85 kHz IPT System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

MAGNETICALLY PERMEABLE CORE AND AN INDUCTIVE POWER TRANSFER COIL ARRANGEMENT

This application is a National Stage Application of PCT/NZ2015/050056, filed 14 May 2015, which claims benefit of U.S. Provisional Patent Application Ser. No. 62/000,237, filed 19 May 2014 and which applications are incorporated herein by reference. To the extent appropriate, a claim of priority is made to each of the above disclosed applications.

FIELD OF THE INVENTION

The present invention is in the field of wireless power transfer systems. More particularly, the invention relates to magnetically permeable cores incorporated into transmitters and receivers in wireless power transfer systems and coil arrangements utilising the cores.

BACKGROUND OF THE INVENTION

Mechanical slip rings utilising direct contact electrical connections are still utilised in a large number of applications. These suffer from contact losses, contact failure and high maintenance costs.

Inductive Power transfer (IPT) systems have been developed which address these drawbacks. A basic problem that must be overcome in wireless power transfer system design is ensuring that power can be transferred between coil arrangements over sufficient displacements (i.e. between the primary side and secondary side), while maintaining sufficient power transfer.

Introducing magnetically permeable elements into either the transmitting coils or receiving coils can improve the performance of the system. Magnetically permeable elements increase the inductance of the transmitter or receiver coils. This means that less coil turns are required to achieve the same inductance value as a transmitter or receiver without magnetically permeable elements. Magnetically permeable elements can also be configured to 'shape' the magnetic field, which can be directed from the transmitter to the receiver. By directing the magnetic field, the coupling factor between the transmitter and receiver can be increased, thus improving the performance of the system.

Current IPT coil arrangements often suffer from a low magnetic coupling coefficient k, which results in limited power transfer capability, particularly for large air gaps, due to magnetic flux leakage between the limbs of the magnetically permeable cores. Decreased power transfer capability results in low efficiency, greater size and greater cost for a given power transfer capacity.

The physical space available for a wireless power transfer system is often limited, including in rotary applications for robotic joints and wind power pitch control. Further, a large air gap is often required for mechanical clearance. When the air gap is large, the magnetic flux tends to leak within the core limbs instead of linking to the other side, which can result in low magnetic field coupling.

It is an object of the invention to provide a magnetically permeable core and an inductive power transfer coil arrangement having improved magnetic coupling, or to at least provide the public with a useful choice.

SUMMARY OF THE INVENTION

According to one exemplary embodiment there is provided an inductive power transfer coil assembly including:

i. a magnetically permeable core including a base having a pair of spaced apart limbs extending therefrom; and
ii. a winding located between and above the pair of spaced apart limbs.

According to another exemplary embodiment there is provided an inductive power transfer coil arrangement comprising:

i. a first coil assembly as claimed in any one of the preceding claims; and
ii. a second coil assembly arranged with respect to the first coil assembly such that there is effective magnetic coupling between the first and second magnetically permeable cores.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
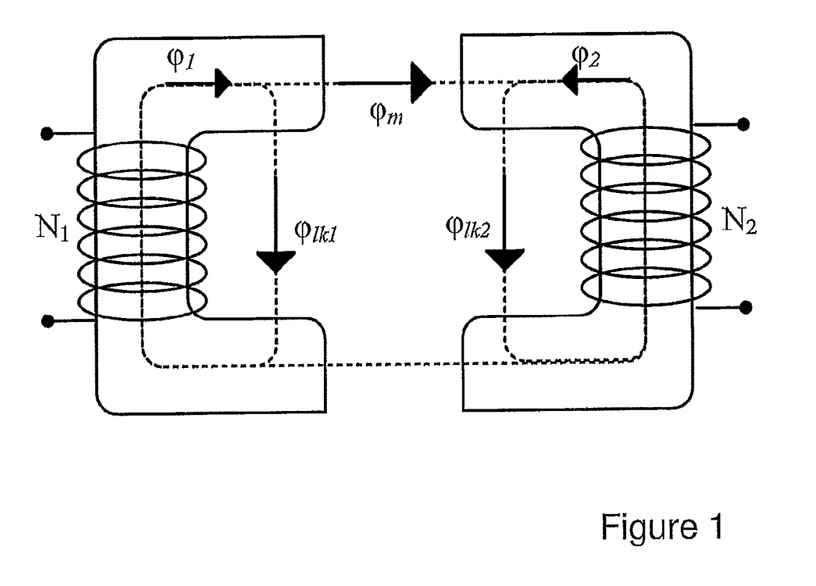
FIG. 1 shows the magnetic flux paths for two standard U cores.
Figure 2:
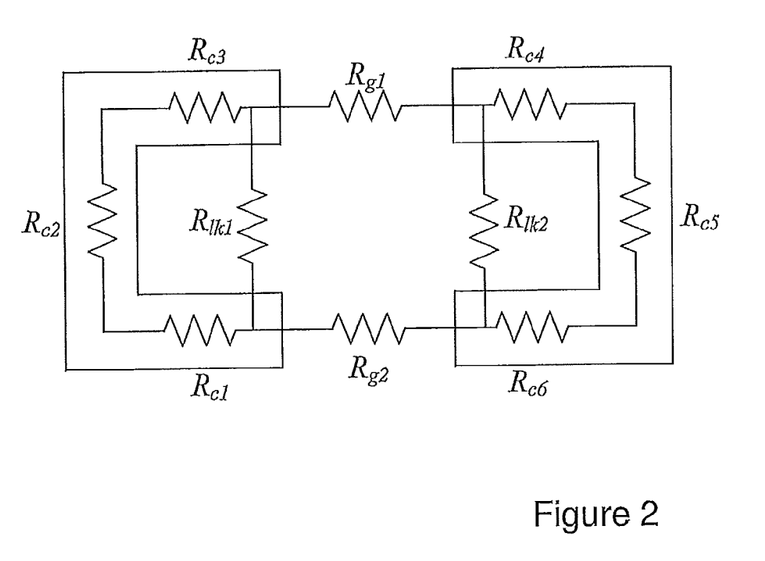
FIG. 2 shows a reluctance model of the arrangement shown in FIG. 1.

FIG. 1 shows the flux paths of a contactless slip ring system using a UU core arrangement. In FIG. 1 the total flux linked by each coil can be divided into two components; a mutual component $\varphi_m$ that is common to both coils and leakage flux components ($\varphi_{lk1}$ and $\varphi_{lk2}$) that links only the coil itself. When a magnetic force (Ampere-Turns) is applied to a magnetic element (such as a section of the core, or an air gap), the amount of flux is determined by the reluctance of that magnetic element. The reluctance of each region of the structure is calculated from its area, length and permeability ($\mathcal{R} = l/\mu A$), and inserted with its specific value into the appropriate location in the reluctance models as shown in FIG. 2.

The reluctances of the regions between the cores limbs ($\mathcal{R}_{lk1}$ and $\mathcal{R}_{lk2}$) are of key importance, the magnetic fields in these regions translate into leakage inductance. Relative permeability equals 1.0 in these non-magnetic regions and in the copper conductors. The primary and secondary leakage inductances can be expressed in terms of their relevant reluctances as:

$$L_{lk1} = \frac{N_1^2}{R_{lk1}} = \frac{N_1^2 \mu_0 A_{lk1}}{l_{lk1}} \quad \text{Equation (1)}$$

$$L_{lk2} = \frac{N_2^2}{R_{lk2}} = \frac{N_2^2 \mu_0 A_{lk2}}{l_{lk2}} \quad \text{Equation (2)}$$

where $A_{lk1}$ and $A_{lk2}$ are the cross-section areas of the leakage flux lines and $l_{lk1}$ and $l_{lk2}$ are the length of the leakage flux lines path which is the distance between the core limbs.

The mutual inductance on the other hand depends on both coils and can be expressed by:

$$M = \frac{N_1 N_2}{R_m} \quad \text{Equation (3)}$$

where $\mathcal{R}_m$ is the total mutual reluctance between two sides expressed by:

$$R_m = R_{e1} + R_{e2} + R_{e3} + R_{e4} + R_{e5} + R_{e6} + R_{g1} + R_{g2} \cong R_{g1} + R_{g2} \quad \text{Equation (4)}$$

Generally, the air gap reluctances are much greater than the adjacent ferrite core legs in FIG. 2, meaning that the core reluctances could be eliminated from Equation (4). Thus for a total air gap $l_g = l_{g1} + l_{g2}$, the mutual inductance is:

$$M = N_1 N_2 / R_m = N_1 N_2 \mu_0 A_s / l_s \quad \text{Equation (5)}$$

Figure 3:
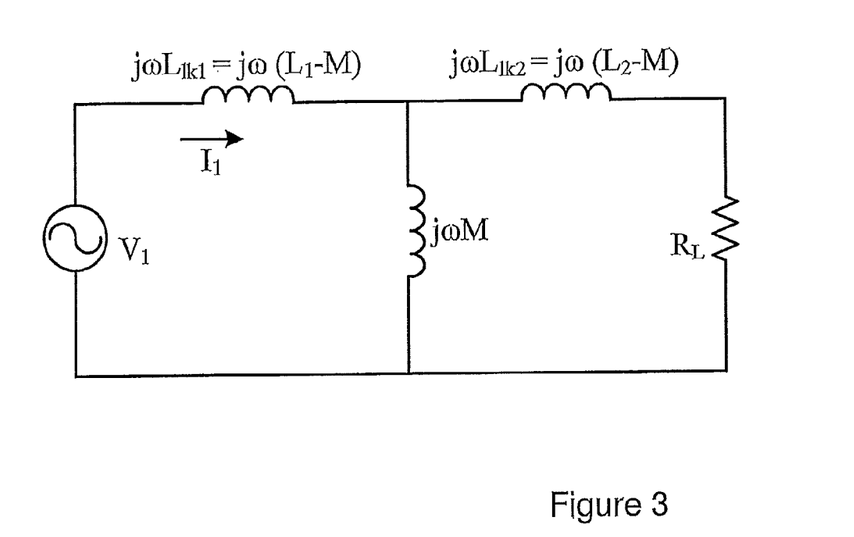
FIG. 3 shows an inductance based T-equivalent circuit of the arrangement shown in FIG. 1.

The reluctance models finally translate to the inductance-based electrical model based on the duality principle as shown in FIG. 3. From FIG. 3 the magnetic coupling coefficient k is calculated based on the system inductances from:

$$k = \sqrt{\frac{M}{L_1} \cdot \frac{M}{L_2}} = \sqrt{\frac{M}{(L_{lk1} + M)} \cdot \frac{M}{(L_{lk2} + M)}} \quad \text{Equation (6)}$$

Substituting Equations (1), (2) and (5) into Equation (6) gives the coupling coefficient k based on the system geometry as:

$$k = \sqrt{\frac{1}{\left(\frac{R_m}{R_{lk1}} + 1\right)} \cdot \frac{1}{\left(\frac{R_m}{R_{lk2}} + 1\right)}} \quad \text{Equation (7)}$$

For a system with identical primary and secondary sides, Equation (7) can be rewritten as:

$$k = \frac{1}{\left(\frac{R_m}{R_{lk1}} + 1\right)} = \frac{1}{\left(\frac{R_m}{R_{lk2}} + 1\right)} \quad \text{Equation (8)}$$

Figure 4:
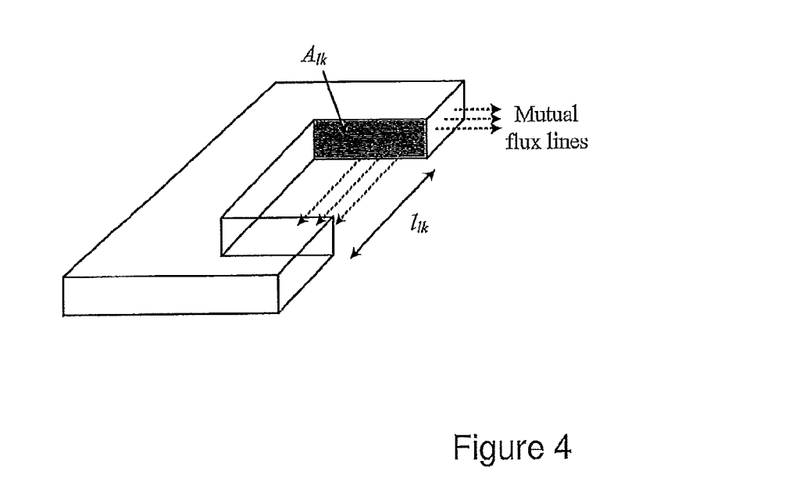
FIG. 4 shows the cross-sectional area and length of the leakage flux lines for the arrangement of FIG. 1.

The magnetic coupling coefficient of Equation (8) can be improved by reducing the ratios $\mathcal{R}_m/\mathcal{R}_{lk1}$ and $\mathcal{R}_m/\mathcal{R}_{lk2}$. Increasing the reluctance of the leakage flux path ($\mathcal{R}_{lk1}$ and $\mathcal{R}_{lk2}$) can be achieved by either increasing the length of the leakage flux path $l_{lk1}$ and $l_{lk2}$ (the distance between the core limbs) or reducing the leakage cross-section areas $A_{lk1}$ and $A_{lk2}$ (see FIG. 4). To improve the magnetic coupling coefficient within fixed structural dimensions, the distance between the core limbs ($l_{lk1}$ and $l_{lk2}$) is kept the same. Thus $\mathcal{R}_{lk1}$ and $\mathcal{R}_{lk2}$ increase by reducing $A_{lk1}$ and $A_{lk2}$ (by reducing the length of the cores limbs as illustrated in the embodiments of FIGS. 5 and 6).

For the mutual reluctance $\mathcal{R}_m$ (the air gap reluctance) as the length of the limbs of the cores is reduced, the size of the air gap increases which results in greater reluctances and accordingly reduced mutual inductance. The mutual inductance is then improved by filling the available provided space (due to the shortened core limbs) with a greater number of turns.

Figure 5:
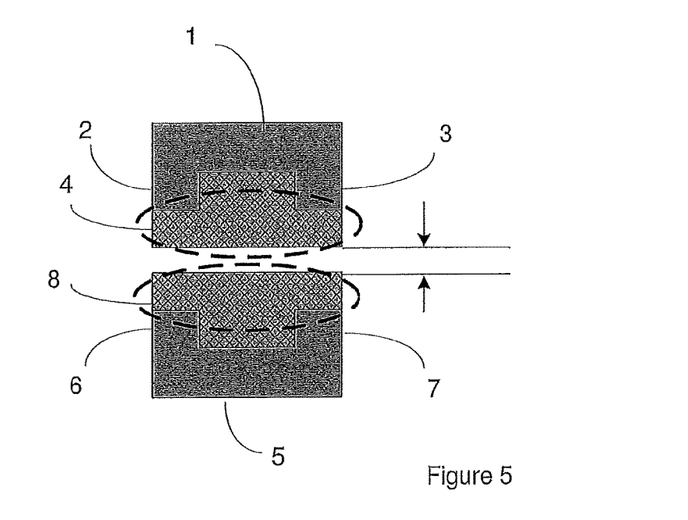
FIG. 5 shows the general configuration of an inductive power transfer coil arrangement according to one embodiment.
Figure 6:
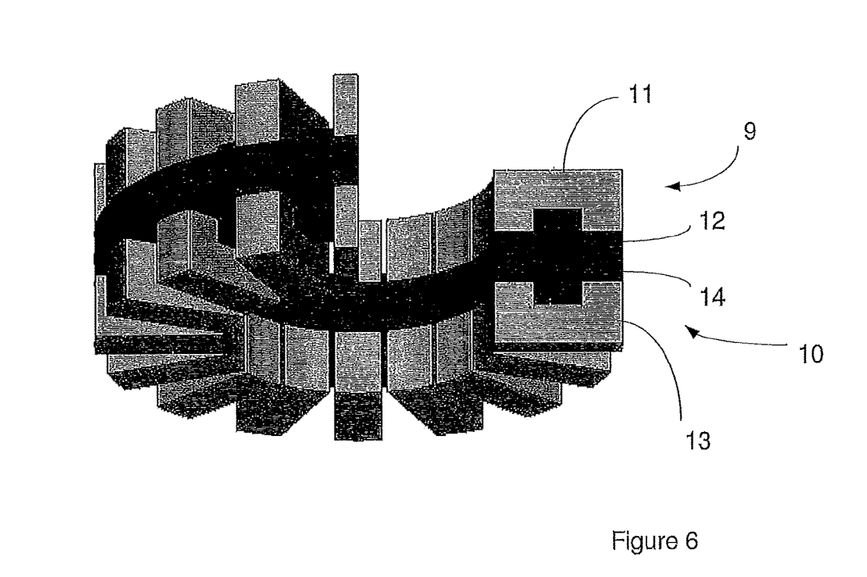
FIG. 6 shows a partially cut away slip ring type arrangement utilising the general configuration shown in FIG. 5.

FIG. 5 shows an exemplary configuration of an inductive power transfer coil utilizing the topology of the present invention. A first magnetically permeable U core is formed by a base 1 and two limbs 2 and 3 extending from the base 1. Whilst transitions between the base and limbs are shown as angular transitions it will be appreciated that curved transitions may provide improved flux flow. Windings 4 are provided between and above the limbs 2 and 3 of the first U core. A second U core is formed by a base 5 and two limbs 6 and 7 extending from the base 5. Windings 8 are provide between and above the limbs 6 and 7 of the second U core.

Counterintuitively this arrangement provides improved coupling due to:
 1. increased M due to increasing $N_1$ and $N_2$ as stated in Equation (3), and
 2. two loops of coils being provided on each side in proximity which enhances the flux linkage between the two sides as shown in FIG. 5. This results in the ratios $\mathcal{R}_m/\mathcal{R}_{lk}$ in in Equation (8) being reduced and an increased coupling coefficient k.

FIG. 6 shows an exemplary slip ring embodiment utilising the topology of FIG. 5. In this embodiment the coil arrangement includes a first coil assembly 9 that is relatively rotatable with respect to a second coil assembly 10, as per a slip ring arrangement. In this embodiment the first coil assembly 9 includes a plurality of magnetically permeable cores 11 (only one of which is indicated) arranged along an annular path. A first coil 12 is wound following the annular path between and above the limbs of each core 11. The second coil assembly 10 includes a plurality of magnetically permeable cores 13 (only one of which is indicated) arranged along an annular path. A second coil 14 is wound following the annular path between and above the limbs of each core 13.

It will be appreciated that the plurality of cores 11 and 13 could each be replaced by a single core of annular form, although this form may be more expensive to produce. It will also be appreciated that this arrangement may also be implemented in linear form—either with a plurality of cores 11 and 13 in parallel linear arrangements or utilizing single opposed elongate cores. Further, it will be appreciated that rather than having the coil assemblies axially spaced they may be concentrically arranged with the limbs being generally radially directed. Whilst two limbs are shown in this embodiment it will be appreciated that three or more limbs may be used in other applications. It will be appreciated that the design may be implemented with or without a through hole.

The coil arrangement of FIG. 6 was modelled using Litz wire, an air gap of 5 mm between the first and second coil assemblies (considered a typical value) and the values specified in Table 1 below:

TABLE 1

| Parameter | Value |
| --- | --- |
| f (kHz) | 50 |
| $N_1 = N_2$ (Typical design) | 4 |
| $N_1 = N_2$ (Present embodiment) | 8 |
| Ferrite Mn—Zn with $B_s$ (T) | 0.5 |

Figure 7:
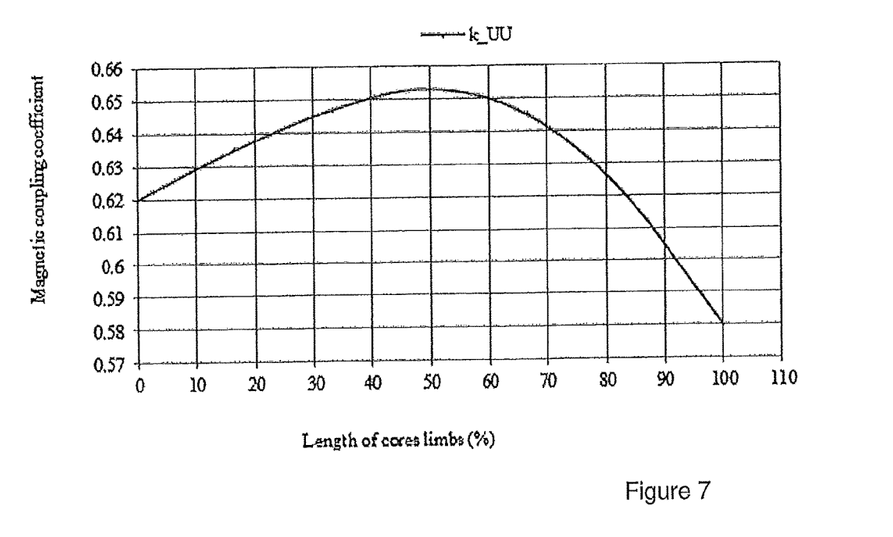
FIG. 7 shows the relationship between the magnetic coupling coefficient and the Length of core limbs (the ratio of the height of the limbs to the height of the limb and winding above the base)

3D-FFM models were used to compare coil assemblies utilizing cores with limbs ranging in length from a core with no limbs (0%) and a core with full length of limbs (100%) are considered. The percentages here representing the ratio of the height of the limb above the base to the height of the limb and winding above the base. The results shown in FIG. 7 show that the magnetic coupling coefficient changes non-linearly versus with the length of the core limbs. The maximum magnetic coupling coefficient of about 0.653 is achieved when the length of the limbs reduced to about 50%. This compares to a value of about 0.58 for a conventional design in which the windings do not extend above the limbs. Thus the magnetic coupling coefficient may be improved by about 13% without increasing the size of the coil assemblies. In fact any value less than about 90% is advantageous with values below about 70% being more advantageous. Ratios between about 20% and about 70% are seen to be particularly advantageous with values between about 40% and about 60% being most advantageous with a maximum at about 50%.

Figure 8:
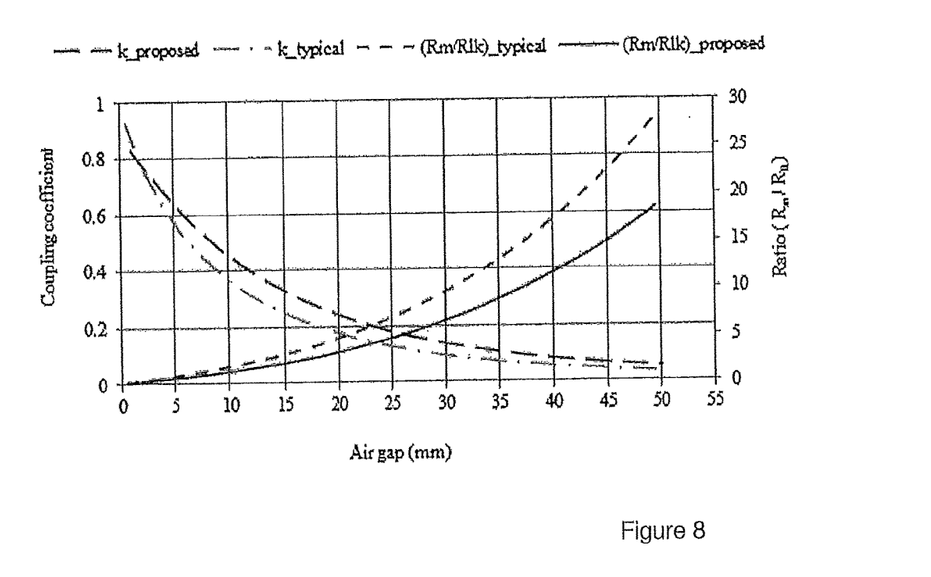
FIG. 8 shows the relationship between the magnetic coupling coefficient and the air gap.

FIG. 8 shows the variation in coupling coefficient for an air gap ranging from about 0.5 mm to about 50 mm. It can be seen in FIG. 8 that for small air gaps (<about 3.5 mm) the magnetic coupling coefficient of a conventional ("typical") design is greater than the coupling coefficient of the present embodiment ("proposed" design, in which the ratio of the height of the limb above the base to the height of the limb and winding above the base is about 50), as most of the flux lines tend to link the other side. As the air gap increases (>about 3.5 mm), the coupling coefficient of the present embodiment increases and remains greater than that of the "typical" design for larger air gaps.

Figure 9:
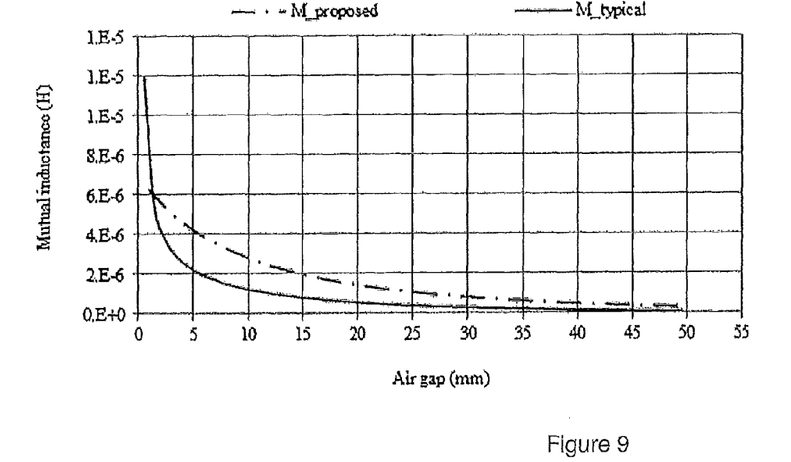
FIG. 9 shows the relationship between the mutual inductance and the air gap.

It will be appreciated that where the air gap is greater than the distance between limbs of the first and second coil assemblies that the arrangement of FIG. 5 provides improved coupling. Such a trajectory for the coupling coefficient k can also be observed from the ratio of the mutual reluctance by the leakage reluctance $\mathcal{R}_m/\mathcal{R}_{lk}$ as shown in FIG. 9. The smaller the ratio $\mathcal{R}_m/\mathcal{R}_{lk}$, the higher the magnetic coupling coefficient as stated in Equation (8). For the present embodiment this ratio is reduced by reducing the leakage cross-section area (shortening the cores limbs) and using the available area for current flow by accommodating a greater number of turns. This greatly increases the system magnetic field coupling as well as mutual inductance within the same physical dimensions as shown in FIG. 9. The maximum improvement in the coupling coefficient k of about 23% is achieved at about an air gap of about 10 mm. For this air gap, the magnetic coupling coefficient of the "typical" design and the improved design of the present embodiment are about 0.35 and about 0.43 respectively.

Figure 10:
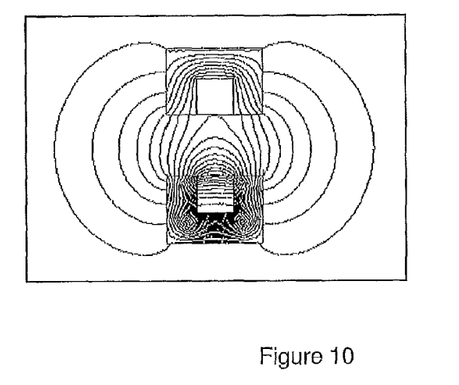
FIG. 10 shows magnetic flux lines for a conventional design.
Figure 11:
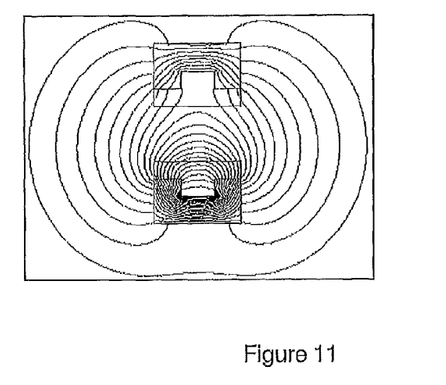
FIG. 11 shows magnetic flux lines for the embodiment shown in FIG. 5.

From FIG. 11 it can be observed that although the flux lines follow larger loops than the conventional topology shown in FIG. 10 when the length of the core limbs is reduced to about 50% of the total limb and winding length, a higher flux linkage is maintained between the two sides. This signifies that the presence of the core limbs has a small impact on the magnetic field coupling between the primary and the secondary coils for a gapped magnetic structure having a large dominant air gap.

Whilst the invention has been described in relation to relatively movable coils it will also be appreciated that the invention will find application in relation to coil assemblies maintained in fixed relationship, especially where large air gaps are required. The invention may also find application in relation to implementations having variable spacing between coils. Further, it is understood by those skilled in the art that the invention is applicable to IPT systems having materials other than air in the 'gap' between the transmitter and receiver coils.

The invention may find application in wide range of inductive power transfer applications including slip rings, stationary wireless charging system for applications such as electric vehicles, linear arrangements such as are used for electric vehicles on roadways and automation, biomedical applications, connectors and couplings etc.

The arrangements described provide improved magnetic coupling for a given physical size. This results in improved efficiency, a more compact construction and reduced cost.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer coil assembly including:
 i. a magnetically permeable core including a base having a pair of spaced apart limbs extending therefrom, the base and the pair of spaced apart limbs forming a U core, each of the pair of spaced apart limbs having a first end adjacent the base and a second end opposed to the first end; and
 ii. a winding located between the limbs and over the second end of each of the pair of spaced apart limbs.

2. An inductive power transfer coil assembly as claimed in claim 1 wherein the ratio of the height of the limb above the base to the height of the limb and winding above the base is selected from the group consisting of:
 less than about 90%
 less than about 70%;
 between about 20% and about 70%;
 between about 40% and about 600; and
 about 50%.

3. An inductive power transfer coil assembly as claimed in claim 1 including one or more core provided along an annular path.

4. An inductive power transfer coil assembly as claimed in claim 3 including a plurality of cores, wherein the winding follows the annular path between the limbs of each core.

5. An inductive power transfer coil assembly as claimed in claim 3 including a single annular core, wherein the winding follows the annular path between the limbs of the core.

6. An inductive power transfer coil assembly as claimed in claim 3 having a through hole at the centre of the annular path.

7. An inductive power transfer coil assembly as claimed in claim 1 including one or more core provided along a linear path.

8. An inductive power transfer coil assembly as claimed in claim 7 including a plurality of cores.

9. An inductive power transfer coil assembly as claimed in claim 7 including a single linear core.

10. An inductive power transfer coil assembly as claimed in claim 8 wherein the winding is provided between and over each core.

11. An inductive power transfer coil assembly as claimed in claim 1 wherein each core has three or more limbs extending from the base.

12. An inductive power transfer coil assembly as claimed in claim 1 wherein the transition from the base to each limb is curved.

13. An inductive power transfer coil arrangement comprising:
   i. a first coil assembly comprising a first magnetically permeable core including a base having a pair of spaced apart limbs extending therefrom, the pair of spaced apart limbs forming a U core, each of the pair of spaced apart limbs having a first end adjacent the base and a second end opposed to the first end; and a winding located between the limbs and over the second end of each of the pair of spaced apart limbs; and
   ii. a second coil assembly having a second magnetically permeable core, the second coil assembly being arranged with respect to the first coil assembly such that there is effective magnetic coupling between the first and second magnetically permeable cores.

14. An inductive power transfer coil arrangement as claimed in claim 13 wherein the first and second coil assemblies are arranged in relatively moveable relationship.

15. An inductive power transfer coil arrangement as claimed in claim 13 wherein there is an air gap greater than about 3.5 mm between the first and second coil assemblies.

16. An inductive power transfer coil arrangement as claimed in claim 13 wherein there is an air gap between the first and second coil assemblies greater than the distance between the limbs of the first coil assembly or the limbs of the second coil assembly.

17. An inductive power transfer coil arrangement as claimed in claim 13 wherein each of the first and second coil assemblies includes either: a plurality of cores arranged along an annular path; or a single annular core provided along an annular path, wherein the winding of each coil assembly follows the annular path between the limbs of the or each core.

18. An inductive power transfer coil arrangement as claimed in claim 17 wherein the limbs of the first and second coil assemblies are generally radially directed.

19. An inductive power transfer coil arrangement as claimed in claim 17 wherein the limbs of the first and second coil assemblies are generally axially directed.

\* \* \* \* \*